US007007270B2

(12) United States Patent
Martin et al.

(10) Patent No.: US 7,007,270 B2
(45) Date of Patent: Feb. 28, 2006

(54) STATISTICALLY BASED ESTIMATE OF EMBEDDED SOFTWARE EXECUTION TIME

(75) Inventors: Grant Edmund Martin, Pleasanton, CA (US); Paolo Giusto, San Francisco, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 761 days.

(21) Appl. No.: 09/799,643

(22) Filed: Mar. 5, 2001

(65) Prior Publication Data

US 2002/0166112 A1 Nov. 7, 2002

(30) Foreign Application Priority Data

Apr. 4, 2000 (EP) .................................. 00107340

(51) Int. Cl.
*G06F 9/44* (2006.01)

(52) U.S. Cl. ...................................... 717/131; 717/154
(58) Field of Classification Search ................ 717/127, 717/131, 135, 148, 154; 703/13, 22; 702/186, 702/119, 123, 176–178; 718/1; 709/223–226; 714/39

See application file for complete search history.

(56) References Cited

U.S. PATENT DOCUMENTS

| 5,270,935 A | | 12/1993 | Dudek et al. |
| 5,590,323 A | | 12/1996 | Kartalopoulos |
| 5,696,942 A | | 12/1997 | Palnitkar et al. |
| 5,761,477 A | * | 6/1998 | Wahbe et al. .................... 718/1 |
| 5,790,425 A | * | 8/1998 | Wagle ......................... 709/218 |
| 5,801,975 A | | 9/1998 | Thayer et al. |
| 5,809,450 A | | 9/1998 | Chrysos et al. |
| 5,966,537 A | * | 10/1999 | Ravichandran .............. 717/158 |
| 6,026,237 A | * | 2/2000 | Berry et al. ................. 717/130 |
| 6,118,940 A | * | 9/2000 | Alexander et al. ........... 717/127 |
| 6,151,618 A | * | 11/2000 | Wahbe et al. .................... 718/1 |
| 6,189,141 B1 | * | 2/2001 | Benitez et al. .............. 717/153 |
| 6,286,046 B1 | * | 9/2001 | Bryant ....................... 709/224 |
| 6,317,727 B1 | * | 11/2001 | May ............................. 705/37 |
| 6,381,558 B1 | * | 4/2002 | Berry et al. ................. 702/186 |
| 6,421,653 B1 | * | 7/2002 | May ............................. 705/37 |
| 6,457,023 B1 | * | 9/2002 | Pinter et al. ................. 707/206 |
| 6,463,457 B1 | * | 10/2002 | Armentrout et al. ......... 709/201 |
| 6,507,946 B1 | * | 1/2003 | Alexander et al. ........... 717/145 |
| 6,609,084 B1 | * | 8/2003 | Midde Peddanna ......... 702/186 |
| 6,618,737 B1 | * | 9/2003 | Aridor et al. ............... 707/205 |
| 6,662,358 B1 | * | 12/2003 | Berry et al. ................. 717/128 |

(Continued)

OTHER PUBLICATIONS

"Capacity Planning For Web Performance Metrics and Models", Daniel A. Menasce et al, published 1998, pp. 1-319.*

(Continued)

*Primary Examiner*—Todd Ingberg
(74) *Attorney, Agent, or Firm*—John W. Carpenter; Reed Smith, LLP

(57) ABSTRACT

A statistical approach to estimating software execution times is implemented by preparing a model of a target processing device, correlating the software to be estimated to benchmark programs used in the preparation of the model, and then applying the software to be estimated to the model. The model is developed by determining the actual execution times of the benchmark programs, determining a number of virtual instructions in the benchmark programs and determining a predictor equation that correlates the virtual instructions to the actual execution time. The predictor equation is determined by a linear regression technique that includes a correlation analysis of the virtual instructions, removal of highly correlated instructions, and a combination of stepwise linear regression and multiple linear regression to determine the predictor equation.

20 Claims, 3 Drawing Sheets

U.S. PATENT DOCUMENTS 6,732,357 B1 * 5/2004 Berry et al. ................ 717/158

OTHER PUBLICATIONS

Capacity Planning And Performance Modeling From Mainframes to ClientServer Systems, Daniel A Menasce et al, Prentice Hall PTR, Englewood Cliffs, New Jersey, 1994, Chapters 1-12, Appendices A-D and index.*

Make Java Fast: Optimize!, Doug Bell, Apr. 1997, JAVAWORLD, http://www.javaworld.com/javaworld/jw-04-1997/jw-04-optimize_p.html, 17 pages.*

SPEC Releases SPECjvm98, First Industry-Standard Benchmark for Measuring Java Virtual Machine Perfromance, Aug. 19, 1998, http:/www.spec.org/jvm98/press.html Standard Performance Evaluation Corporation, 67 pages.*

"Analysis and Development of JAVA Grande Benchmarks", J.A. Mathew, et al, University of Adelaide Australia, 1999, 9 pages.*

IEEE Dictionary, published 2000, p. 96.*

The Benchmark Book, Rich Grace, 1996, non blank pp. 1-313.*

"Tuning Java Performance", Paul Tyma, Dr. Dobbs, Apr. 1996, pp. 1-8.*

ACE Associated Computer Experts (2001), "Table of Contents," http://www.ace.nl/cont.htm, 2 pages no content.

EMBC (2001), http://www.eembc.ort, 1 page cover sheet no content.

Estrel Web (2001), Esterel Synchronous Language Web Main page, http://www.esterel.org, 3 pages.

* cited by examiner

STATISTICALLY BASED ESTIMATE OF EMBEDDED SOFTWARE EXECUTION TIME

BACKGROUND OF THE INVENTION

1. Field of the Invention

The present invention relates generally to software design. The invention is more particularly related to estimation of execution time of software. The invention is still more particularly related to the estimation of execution times of microprocessor based (embedded) software.

2. Discussion of Background

Embedded system designers are continually under increased pressure to reduce the design turnaround time of software and electronics, and often, at the same time, facing continuously changing specifications. One of the major design validation problems is the evaluation of different HW/SW partitions.

Today's approaches are often carried out at the co-verification level—a virtual prototype of the system under validation is built. For example, FIG. 1 provides an example architecture for Hardware/Software Co-Verification From Post-Partitioning Through Physical Prototype. The architecture supports hardware simulation and software development tools.

In today's approaches, the embedded SW is compiled and run on a Instruction Set Simulator (ISS) while the hardware part is simulated by running actual VHDL or Verilog implementations on a logic simulator—the communication between the two partitions being simulated at the bus transaction level. The clear advantage of this approach resides in the accuracy of the simulation results. The disadvantage is in the simulation speed—complete system simulations can be too slow for exploring the design space efficiently. Therefore, in order to reduce the turnaround time, the level of abstraction is raised.

Separating behavior from architecture is a key paradigm for achieving such a goal. In this way behavior and the architecture can co-evolve: while architecture requirements (e.g. cost) may lead to behavior modifications, new constraints in the behavior may require architectural changes. Good system design practice maintains an abstract specification while allowing independent mapping of behavior onto architecture. This is the essence of what has been termed function/architecture co-design and that provides the basis for VCC methodology.

VCC is a design tool developed by Cadence Design Systems for Virtual Component Co-Design. The VCC environment supports both Intellectual Property and Virtual Component based design flow where the architectural IPs are represented in terms of their performance models and are used to back-annotate the behavioral description of the design with timing information. To make sure that the HW-SW trade-offs are accurately explored it is key to provide accurate estimates of execution time of the behaviors that are mapped to SW implementations.

The VCC SW estimation framework models both the target system (CPU instruction set, target compiler, etc.) and the structure of the software program at an abstraction level that makes the estimation time reasonable without losing too much accuracy. However, as noted above, designers are still facing increased pressure to reduce design time, and, increased accuracy is also helpful in turnaround and product quality.

SUMMARY OF THE INVENTION

The present inventors have realized that a statistical approach can improve results of current software estimation techniques. This is achieved in two steps. In the first step, a model of the target processor is derived in terms of a Virtual Processor Instruction Set by combining existing building blocks in a unique way:

1. A front-end compiler optimizer is used to eliminate sources of inaccuracies in the code to be estimated such as dead code, constant-loop assignments, etc.;
2. A set of domain specific (wireless, multimedia, automotive) benchmark programs are selected;
3. A VCC virtual compiler and estimator is utilized to determine the number of executed Virtual Instructions for the benchmark programs;
4. An Instruction Set Simulator (ISS) for the target environment is used to measure the actual execution time of the benchmark programs;
5. Multiple linear regression is performed to determine a predictor equation for the estimated time along with degree of confidence in the error of the estimation, the error of the estimation vs the control/computation ratio of the SW to be estimated, and the number of cycles of each Virtual Machine instruction that constitutes the Virtual Processor Model to be used in the next step.

In the second step, the similarity of real application code to be estimated to the existing set of benchmarks used to derive the processor model is determined by a 2-sample t-test. If this is the case, then the application code is optimized with the very same front-end optimizer and then a simulation model with annotated execution time is produced by the VCC compile-code generator/annotator.

The present invention is embodied as a device for performing estimates of software execution times, comprising, a model of a target processor based on execution time of a set of at least one benchmark program, a correlating device configured to correlate a software program to be estimated to the set of at least one benchmark program, and an estimation device configured to apply the software program to be estimated to the model to determine an estimated execution time of the software. The present invention also includes a device for estimating execution times of software, comprising, modeling means for modeling a target processor, correlation means for correlating software to be estimated to a set of benchmark software programs that were used as a basis in said modeling means, and an estimation device configured to apply the correlated software to said modeling means to determine an estimated execution time of the software.

The present invention includes a method of estimating the execution time of software, comprising the steps of, preparing a model of a target processor based on a set of benchmark programs, correlating the software to be estimated with the benchmark programs, and applying the correlated software to the model to determine an estimate of the execution time of the software.

At least portions of both the device and method may be conveniently implemented on a general purpose computer, or networked computers, and the results may be displayed on an output device connected to any of the general purpose, networked computers, or transmitted to a remote device for output or display. In addition, at least portions of the present invention may be embodied as a set of executable, interpretable, or compilable instructions and may be stored on a computer readable media or in electronic signals transported in any medium (e.g., network packets, radio transmission, etc.).

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
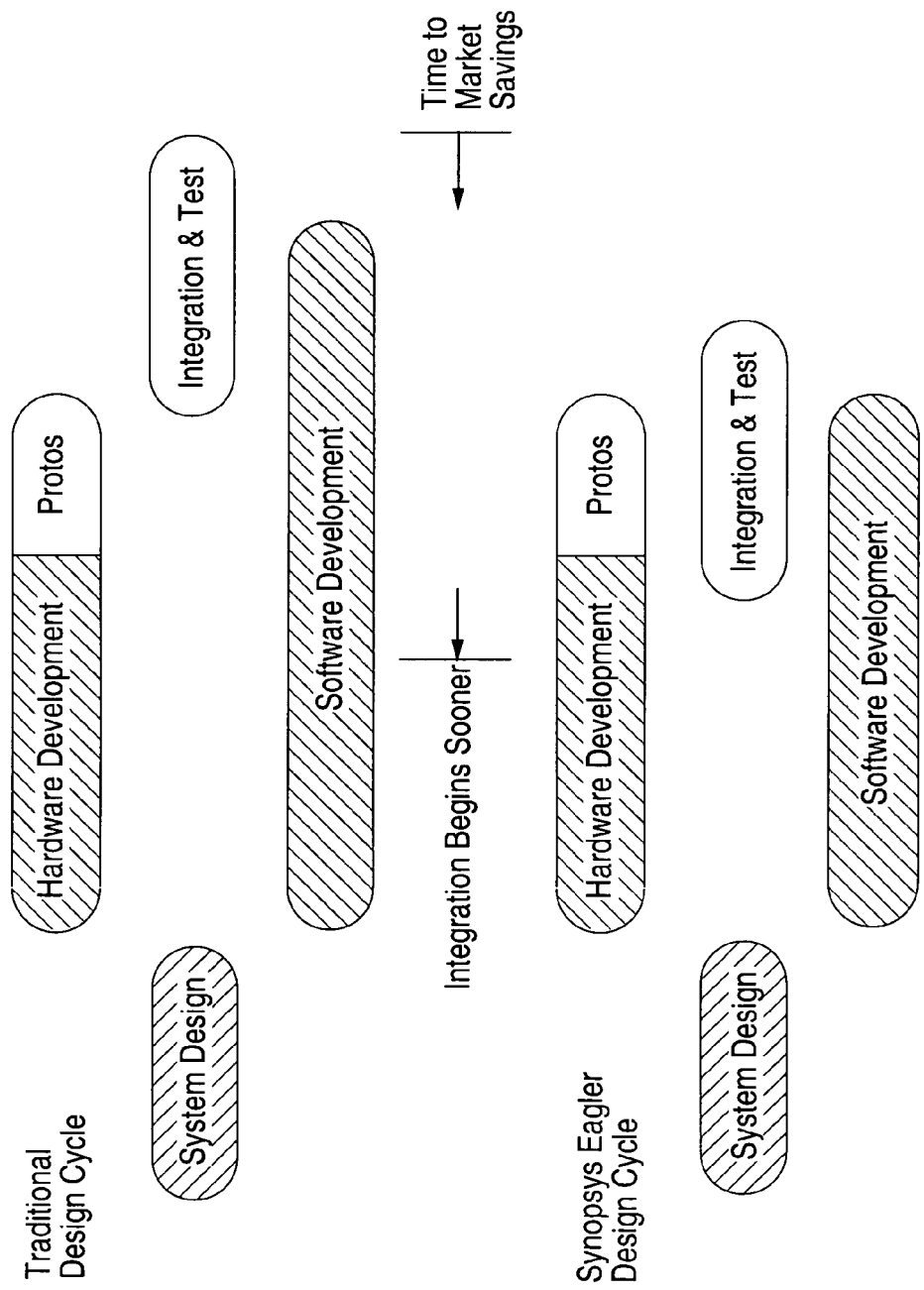
FIG. 1 is a block diagram of an example architecture for Hardware/Software Co-Verification from Post-Partitioning through Physical Prototype.

Before continuing with a detailed analysis of the present invention, a closer look at current methodologies that set the environment in which the invention was developed and the present inventors' observations are in order. Currently, software (SW) performance estimation presents caveats and drawbacks that limit its effective usage. The techniques that have been developed in this area can be described in terms of the following features:

The level of abstraction: source code based, object code based, ISS based, etc.;

The constraints on the type of SW for which performance estimation will work: control dominated vs. computation dominated, pointers vs. static data structures, etc.;

The type of analysis: static (no simulations needed) vs. dynamic;

The actual method: estimation vs. modeling, statistical, etc.;

The cost for the modeler: high, medium, low;

The simulation speed: slow, fast, relatively fast, relatively slow;

The granularity of the analysis; and

The accuracy of the results.

Software performance estimation can be generally categorized into two different approaches, source based approaches and object based approaches. A source-based approach uses compilation onto a virtual instruction set, and allows one to quickly obtain estimates without the need for a compiler for the target processor. An object-based approach translates the assembler generated by the target compiler to assembly level-functionally equivalent C. In both cases the code is annotated with timing and other execution related information (e.g., estimated memory accesses) and is used as a precise, yet fast, software simulation model.

Some results are available at object code level (relatively low level of abstraction), for software with a limited structure—programs using constructs such as dynamic data structures, recursive procedures, and unbounded looping are difficult to evaluate statically. In one software synthesis system, all primitives for constructing a program are defined as a fixed sequence of instructions. The execution time and code size of these instructions are pre-calculated, hence, they can be used to yield accurate predictions of performance.

The static analysis of arbitrary code poses additional problems. In one system, a set of linear equations are used to implicitly describe the feasible program paths. This approach has the advantage of not requiring a simulation of the program, hence it can provide conservative worst-case execution time information. However, since this analysis is targeted at the analysis to a single program that limits its effective usage. Embedded systems, on the other hand, are composed of multiple tasks, accessing common resources, whose dynamic activation can significantly modify each other's execution path or timing behavior (e.g., by changing the state of the cache).

Software performance estimation has become more important as new approaches for the synthesis and verification of real-time embedded systems have been developed. In this context, several approaches have been proposed. For example, a prediction method, where execution time is made proportional to the product of the number of executed instructions and the MIPS rating of the target system. In some cases, statistical methods are proposed to model the performance of a target CPU so that several CPUs can be evaluated with respect to the code that must be run on them. One model estimates software performance by the number of execution cycles needed for each instruction in the program, the number of memory read/writes, and the number of cycles per memory access. In another system, the given software program runs on a synthesized RT level target system and SW timing characteristics are extracted from the simulation results.

In systems like the architecture of FIG. 1, filtered information is passed between a cycle-accurate ISS and a hardware simulator (e.g., by suppressing instruction and data fetch-related activity in the hardware simulator). This approach is precise but slow and requires a detailed model of the hardware and software. Performance analysis can be done only after completing the design, when architectural choices are difficult to change. In another system, the control flow graph (CFG) of the compiled software description is annotated with information useful to derive a cycle-accurate performance model (e.g., considering pipeline and cache). The analysis is performed on the code generated for each basic block and information about the optimization performed by an actual compilation process is incorporated. It considers register allocation, instruction selection and scheduling, etc. An object code-based approach also uses this scheme.

Instead of restricting the input one can alternatively require that a trace of the program's execution on some sample data be used to drive the analysis. This approach is referred to as profiling and is often applied to extant software systems. Trace-driven schemes at the Register-Transfer (RT) level and using statistically-generated loads have also been proposed. In unmodified form, these methods require a very detailed model or an instance of a system similar to the one being designed. Here, estimates are to be available before such detail is available. To avoid this requirement, a trace-driven approach can be used. Instead of a pure profiling approach that treats the time axis as independent and samples the execution of the program, the execution of the functional model is the independent variable and execution delays are projected forward into the simulated future. Performance analysis can occur at the level of the system where a statistically relevant set of benchmarks are applied. Where this is too expensive it has been proposed that the analysis occur the level of sets of control flow paths, forgoing the precision and expense required to determine delay along an individual path.

In the computational-dominated code domain, one methodology for estimating execution time of SW running on a DSP has been proposed. The technique is based upon defining a set of kernel functions whose execution times are pre-characterized, for example, via profiling. The algorithm to be estimated is then built from a static composition of the kernels for DSP applications (synchronous dataflow). A POLIS SW estimation method may also be used: the original C code is annotated with timing estimates trying to guess compiler optimizations. This source-based approach has the advantage of not requiring a complete design environment for the chosen processor(s), since the performance model is relatively simple (an estimated execution time on the chosen processor for each high-level language statement). The approach is targeted to. Control-dominated code, and it cannot consider compiler and complex architectural features (e.g., pipeline stalls due to data dependencies).

Approach of the Present Invention

The approach of the present invention can be classified as a source-based approach, with no constraints on the SW (any arbitrary C code), with relatively low cost for the modeler, with relatively fast simulation speed, with dynamic (simulations are needed) and statistical analysis-based approach. The present invention provides a degree of reliability in the estimates which was missing in some of the above described approaches. The present invention also provides a semiautomatic way, via a predictor equation, to find and then assign a performance model to the kernel function therefore improving methods using linear equation sets to describe feasible program paths. Also the affinity of a new benchmark program to the existing set can be inferred, and the error of the estimation vs the control/computation ratio of the SW are estimated.

The present invention does not necessarily provide the accuracy of an object-based or ISS based approach. However, the present invention provides an error in the estimates that has a degree of statistical confidence, and therefore the designer can make an assessment whether the estimates can be used to make tradeoff decisions or a more expensive technique such as object or ISS-based should be used.

Reliable Execution Time Estimation

A dynamic source-based SW estimation technique is based on the idea of abstracting the actual machine instructions which would be executed by a SW task running on a target processor into a set of Virtual Instructions. Virtual Instructions are instructions classified within a generic family of microprocessor instructions (e.g., If statements, GOTO statements, Load from memory (LD), Store to Memory (STO), $OP_i$-32 bit operator on an integer, $MUL_i$-Multiply Integer, etc. Some of the instructions that fall into a generic family of microprocessor instructions map directly into machine instructions, and typically there are multiple different actual machine instructions that any specific generic family member can be mapped into (for example, different types of IF statements are mapped into different machine instructions), but the overall family of instructions are represented by a single type of virtual instruction (i.e., all different IF variants are represented by a single IF virtual instruction, all GOTO variants are represented by a single GOTO virtual instruction, etc.). Each basic block in the SW task is compiled into a count of the number of Virtual Instructions which would cover the execution of the block; during simulation the SW task is executed natively on a host workstation, but the number of Virtual Instructions which would be executed on the actual target processor is accumulated.

Modeling the combination CPU/Compiler at this level of abstraction has been proven to be a very difficult task. In fact, different compilers may produce different results on the very same code in terms of the assembly instructions that are generated and therefore executed. The same compiler can produce different code depending on optimization flags. Therefore, we believe that any source-based approach is not a push button solution. The key idea is to provide a correct interpretation of the Virtual Machine instructions depending upon how well the VCC compiler/estimator models the pair CPU/Compiler—two different interpretations are available:

1) rigid: the VCC compiler models well the target environment; therefore each Virtual Instruction truly represents the corresponding class of assembly instruction(s). It then makes sense to consider the cycles provided by a Data Book as a good approximation of the real cycles and assign those cycles to the Virtual Instructions; and 2) relaxed: the VCC compiler doesn't model well the target environment therefore the Virtual Instruction is a factor in predictor equation.

Relaxed leads to a statistical approach with a degree of confidence in the prediction. Anything in between rigid and relaxed should be evaluated case by case.

Currently, in VCC, the Virtual Instructions are a simplified view of a RISC instruction set, including LD (load from memory), LI (load immediate), ST (store), OP(i,c,s,l,f,d) (basic ALU operators for integer, char, short, long, float, double), etc.

Each Virtual instruction on the target processor is characterized via a number of methods as to the number of actual target processor cycles which are covered by the Virtual instruction. This leads to the predictor equation:

$$\text{Cycles} = \sum_i P_i * N_i$$

where $N_i$ is equal to the number of Virtual Instructions of type i, and $P_i$ is equal to a parameter which translates the Virtual Instruction onto a cycle count. $N_i$ is computed by compilation of the SW task in VCC and the generation of an annotated version of the task which accumulates each occurrence of a virtual instruction during host-based execution.

Pi can be determined in several ways:

1) From the datasheet of the target processor (rigid interpretation);

2) Using a best fit least squares approach to a calibration suite; and

3) Using a stepwise multiple linear regression approach over sets of tasks drawn from a similar domain (relaxed interpretation). Note that this approach can start from a solution derived from the above method and then be used for tuning the results.

In the latter case, constraints on the set of linear equations must be relaxed since the Virtual instructions do not have a semantic correspondence to the target processor assembly instructions. In Table 1, we illustrate tradeoffs involved with the different interpretations of the Virtual Instructions. Also, the positioning of the technique with respect to the object-based as well as ISS based techniques is shown.

TABLE 1

SW Estimation Techniques

| Estimation Approach | Type | Creation Effort | Accuracy | Speed |
|---|---|---|---|---|
| Statistical VI (no constraints) | Relaxed Source Code-Based | Easy w/SW Benchmarks | Medium | 100+ Times |
| Data Book VI | Rigid Source Code-Based | Easy w/SW Benchmarks | Medium | 100+ Times |
| Tuned (VI) (constraints) | Semi-Rigid Tuned Source Code-Based | Easy w/SW Benchmarks | Medium | 100+ Times |
| Kernel Function | DSP Oriented | Moderate w/Profiling | Good To Very Good | N/A |
| Compiled-Code ISS | Object-Based | Moderate | Very Good | 50 + Times |
| ISS Integration | ISS in the loop | Very High | Excellent | 1 |

Below, using processor A as an example, we will illustrate these techniques and discuss their advantages and disadvantages. The sample set we used in these studies consisted of 35 control-oriented (decision dominated) SW tasks running approximately 200 cycles per task. These were drawn from the automotive control domain.

Example Basis Determinations

Determining a basis for the software estimations can be performed in a number of different ways. Two prominent examples applied with varying degrees of success are the datasheet and calibration approaches.

The datasheet approach draws the parameters Pi from a study of the published processor A datasheet and by analogy between the actual machine instruction set and the Virtual Instruction set. This has two main issues:

1) Some interpretation of the cycles reported per instruction is required-effects such as pipelining have an impact; and 2) For instructions with variability in their number of cycles, based on processor state, a decision must be made as to whether to use worst, best or some nominal case.

For example, in processor A, the LD and ST instructions (load and store to memory) take a nominal 3 cycles. However, the processor has a three-stage pipeline, and depending on the compiler quality and the task, the processor may be able to perform other instructions while waiting on memory and not stall. In fact, intelligent compilation in most cases reduces the actual LD and ST effective cycle count to 1 or very near it. Using the original cycle count of 3 gives a very pessimistic estimator.

Another similar issue occurs with SUB and RET (subroutine calls and returns). Processor A will store to memory only the part of the register set actually in use, which can vary from 0 to 15 registers, on a call to a routine. Similarly on return, only the needed number of registers are recovered from memory. Use of the worst case in SUB and RET assuming all 15 user registers must be saved, leads to parameters of 19 and 21 for SUB and RET, which are very pessimistic or conservative in most cases. However, the actual number of registers typically used varies from task to task in a dynamic way and we cannot find a nominal or typical value without a statistical study of some kind.

We used 2 parameter files (called basis files) derived from datasheet analysis of cycle counts over the set of 35 benchmarks. In the first, all Virtual instructions are estimated on the most conservative basis; in the second, the loads and stores are reduced from 3 to 1 cycle. Using the first estimator, the error % (comparing prediction to actual cycles) ranges from –8.5% to 44%, where a positive error indicates a pessimistic estimator. In general, the estimator is conservative and the spread of error is over 50%. Using the second basis file with more realistic load and store cycle counts, we get an error range of –28% to 18% clearly less pessimistic (actually now a little optimistic) and with a total error range of 46%.

However, the present invention is an improvement of the technique including a reduction of the expected error ranges. The datasheet method is insufficiently dynamic and not tuned to particular SW task domains and thus cannot be expected to give a very good estimator for particular kinds of tasks. Although one can correct the load/store cycle counts, there is no easy way to correct for subroutine call and return overheads; thus in general for large tasks with much hierarchical function call structure the technique will still be very conservative. This in fact has been our experience with VCC.

The calibration approach is a different approach to deriving a processor basis file is to create a special calibration suite of programs which each attempted to stress some part of the virtual instruction set, and then to do a least squares fit of actual cycles for the set of tasks to the numbers of occurrences of the virtual instructions in each task. This was used to derive a basis file in which the parameters for each virtual instruction were based on experiential data from the calibration suite.

In this basis file, the parameter for loads and stores was 0.1, for multiplies ranging from 2.6 to 149.3, (depending on operand type), for IF 1.6, etc.

In applying this to our set of 35 benchmarks, we had an error range of 55 to 15% (all estimates optimistic, underestimating the number of cycles), for a total error range of 40%.

Several problems exist with the calibration approach:

1) Choice of calibration test suite—in our case the experiments were done with a few standard programs (e.g. SPEC type programs such as 8 queens, sort, FFT, and a set of highly synthetic programs created to stress particular virtual instructions). The relationship between this kind of suite and any particular embedded SW domain in terms of characteristics is marginal at best. In particular, it may overemphasize mathematical processing (since many of the synthetic programs are to find values for MUL and DIV variations) at the expense of good control-oriented predictors.

2) Over-determined analysis—with 25 virtual instructions and a calibration suite of about 20–30 programs, this is an over-determined system in which the least squares fit will achieve perfection or near-perfection on the calibration suite but has little a priori basis on which one can apply it to other programs.

3) Possible lack of robustness—the calibration suite and over-determined analysis means that for programs from a different domain, the calibration suite basis file may give very inaccurate results. Indeed, this was seen in our set of 35 control programs where it was both extremely optimistic and gave worse results on aggregate than the data book approach.

4) High correlations between the Virtual instructions—the assumption is that these instructions are all statistically un-correlated—that they are all independent variables with the cycle count being the only dependent variable. However, in actual programs the relative frequency of one virtual instruction often has very high correlation with others (for example, loads with basic ALU operators, or loads with IFs). This implies that simpler, more robust estimators may be possible in which the number of independent variables is reduced to a minimum.

5) Difficulties in user interpretation—Users expect the calibration approach to give parameters which make sense. That is, all virtual instruction parameters must be 1 or greater (since no real instruction takes less than a cycle to execute), preferably integral, and scaling logically. However, the best fit approach is just looking for parameters in an equation. On taking this approach, the parameters no longer have any real relationship to cycle count for a virtual instruction. They are just Multiplicative Factors derived from curve fitting and used in a predictor equation. This is a hard point to make to users who are unfamiliar with this kind of approach.

However, the calibration approach does point the way towards a more solidly-grounded statistical approach, but one based on 3 premises:

1) Analysis based on actual SW programs drawn from specific domains—automotive, communications, control-oriented, mathematically-dominated;

2) An attempt to reduce the number of Virtual instructions used in the predictor to a minimal number of independent variables and thus give a more robust and meaningful estimator; and 3) By exposing positive and negative correlations between various virtual instructions and cycle count, to move away from the idea that parameters or factors have a cycle count meaning.

The Statistical Estimator Approach Of the Present Invention

The present invention abandons prior ideas for creating a single predictor for all SW tasks. Instead, the present invention uses a statistical technique to derive a predictor for specific SW task domain, and then study the applicability of the predictor to other domains.

The approach used is a stepwise multiple linear regression approach, along with basic multiple linear regression, and correlation analysis. The SW task domain is the set of 35 control oriented automotive benchmarks discussed earlier.

As a control set, the present inventors utilized a set of 6 control software tasks written in the Esterel programming language. The estimators derived from the 35 tasks were then applied to the control set to determine error. However, the results derived from the set of 35 give poor results on the control set of 6. We then conduct a simple 2-sample t-test on the 2 sets of benchmarks to give us a basis for concluding that the control sample is not drawn from the same population as the benchmark sample.

The set of virtual instructions actually generated by the VCC annotator in the 35-sample set are 10: LD, LI, ST, $OP_i$, $MUL_i$, DIM, IF, GOTO, SUB and RET. We start with the assumption that these are all Independent variables, and use total cycle count for the task (Cycles) as the Dependent variable.

To capture run-time task interaction the evaluation is done dynamically in a simulation environment. Moreover, it should be fast enough to enable the exploration of several architectural mappings in search of a best implementation. We focus mainly on software written in C, because this is the dominant high-level language in embedded system programming. However, the present invention may be applied to other languages. Moreover, our approach can also be used (with some limitations) to estimate computation dominated code software.

On applying the stepwise multiple regression, we get several interesting results:

1) The numbers of $MUL_i$ and DIM in the benchmark set are a constant, and therefore must be thrown out (with no variance, an assumed independent variable will have no correlation with the dependent variable of Cycle count);

2) Only one independent variable, LD, is added to the equation, giving an equation of:

Cycles=145+4*LD(1)

and a $R^2$=0.363

The $R^2$ measure is a key one in regression. Essentially, it measures how much of the total variance in the dependent variable (in this case, Cycles) can be explained by the variance in the independent variables which are being regressed upon. So 36% of the variance in cycle count is explained by the variance of the LD virtual instruction.

In addition, note that regression in general will give equations with intercepts. (i.e. a constant factor). These can be interpreted in several ways, one of which is the amount of setup required to run and stop a software task. However, another view is that it is just a constant which makes the regression fit better. It can be misleading to assume that regression parameters measure anything other than correlation. So the 4 for the LD parameter can be interpreted that each LD on average attracts 4 cycles of various instructions including itself; or it can be interpreted as an essentially meaningless, statistical phenomenon that can be used to predict cycles but has no inherent meaning.

When we back-apply this equation to the set of 35 samples, we get an error range of −13 to +17% a range of 30%. Note that this is better centered and a smaller error than from any of the databook or calibration suites. The applicability of this equation to other samples will be discussed later.

If we perform ordinary multiple linear regression, using all variables except $MUL_i$ and $DIV_i$, we get several more results:

1) RET is zeroed out since it is directly related to SUB in the sample (thus the two are 100% correlated)

2) we get an equation:

Cycles=354+1.5*LD+31.9*LI−30.4*ST−7.1*$Opi$+13.6*IF−5.1*GOTO−51.5*SUB(2)

with an $R^2$=0.4965. This equation explains 49.65% of the variability of the cycle count. When back applied we get an error range of 10.3 to +19.4%.

Note that:

1) We have an intercept (354) greater than the number of cycles (200–250) of most of the sample set;

2) We have negative coefficients or parameters;

3) Many of them are large (31.9 for LI) (51.5 for SUB); and

4) The package complained that multicollinearity is a severe problem (i.e. that several of the supposed independent variables of LD, LI, ST, OPi, IF, GOTO and SUB are actually correlated highly. This is clear from the stepwise regression results.

In other words, this equation is a pure statistical fit of the cycle count to the input variables without any regard for the parameters having an operative meaning related to cycles per instruction.

To reduce the multicollinearity problem the present inventors generated a correlation matrix for the independent variables and got correlations of LD-OPi of 0.92, Opi-IF of 0.99, and LDIF of 0.88. This implies that 2 of these 3 variables can be removed since they are all highly correlated. Re-running regression with just 5 independent variables: LD, LI, ST, GOTO and SUB, results in an equation of:

Cycles=273−0.9*LD+23.3*LI−18.9*ST+0.06*GOTO−38.7*SUB(3)

with an $R^2$=0.47 and an error range of 10 to +22.5%.

Note again that there is no operative or implied meaning to the intercept and coefficients. The package reported that multicollinearity is a mild problem (we could throw out other variables eventually we will end up back at the result reported by Stepwise regression with just LD in the equation).

Results

The present inventors applied 2 of the regression equations (1) and (3) above to a sample set of 6 from some Esterel benchmarks. These performed poorly, overestimating the cycle counts by (for (1)) 23% to 60%, and for (3), 87% to 184%. In this sample set, we also had virtual instruction OPc appear and we used the parameter for ON where applicable (in (3)).

The poor results are accounted for by the applicability of a statistically derived predictor based on sample A, to a new sample B, must rest on an argument of similarity that sample B has similar characteristics to A. In another perspective, one can argue that Samples A and B could have been drawn from the same underlying population. One way of testing this hypothesis is a 2-sample t-test. This tests the assumption that the 2 samples are drawn from the same underlying normal distribution with equal means and variances.

We need some characteristic of the SW tasks to compare, and one that is independent, for example of cycle count. One idea is that the ratio of the number of virtual IF instructions to the total cycle count is a measure of the control-dominance of a SW task. i.e. control dominated tasks will have a higher ratio than algorithmic or mathematically dominated ones. This is perhaps a tenuous argument, but it is difficult to come up with an unambiguous measure of control dominance for tasks.

Using this ratio, we get the following statistics:
35-sample automotive control batch:
mean ratio=0.1077, std. deviation=0.016
6-sample Esterel batch:
mean ratio=0.0300, std. deviation=0.0168

The 2-sample t-test rejected the hypothesis that these 2 samples could have been drawn from the same underlying normal distribution; in fact, normality itself was rejected for the second sample.

Using this 2-sample t-test idea, we can apply this kind of discriminating function to new batches of tasks to determine whether it is reasonable to apply a predictor equation drawn from another sample to the new one. Thus this may allow us to discriminate between domains of applicability of predictors. To test this further, we went back to the first batch of 35 automotive control examples and randomly selected 18 of them, and reran regression on the 5 variables LD, LI, ST, GOTO and SUB: this gave us the equation $$Cycles=219+1.3*LD+10.9*LI-10.2*ST-5.2*GOTO-21.3*SUB$$
with a $R^2=0.568$.

We applied this equation to the remaining half of the first batch (17 samples) and got an error range of the predictor of 12% to +5%. Applying the 2-sample t-test to these batches of 18 and 17 tasks, using the characteristic of ratio of IFs to total cycles, we accept the null hypothesis—i.e. there is a high probability that the 2 samples could be drawn from the same population (which they are).

This demonstrates that a predictor drawn from a particular domain sample can with justice be applied to further samples from that domain, and that a simple discriminator can be used to check if samples of SW tasks could indeed be drawn from the same population (and thus the applicability of the discriminator).

To further study the techniques, the present inventors utilized a set of Virtual instruction and cycle counts for 18 FFT tasks. Here we used the predictor (4) above and found that it was very poor over 100% error. We generated a predictor using regression for the FFT and got Cycles=286,387+2153*MULd (MULd=double precision multiply). In fact the intercept of 286,387 could be thrown out and we could use Cycles=2153*$MUL_d$—these benchmarks ran for a huge number of cycles (eg. 564,038,767, or over 1 billion cycles for others), thus the intercept of 286 thousand is trivial in comparison. In these benchmarks, the error using this predictor is +/-1%. The present inventors have discovered what is actually a kernel function—an internal kernel function, rather than an external one. A kernel function is a predictor for a heavily mathematical SW task in which the cycle count is dominated by statically predictable mathematical operations rather than dynamic control dominated branching. Due to the static nature of the computations (for example, loops with a priori known iteration sizes rather than based on dynamic iteration counts or convergence tests) kernel functions can be highly predictable and with very low error. The FFT examples clearly demonstrate this phenomenon. In this case, the kernel function is expressed in terms of an internal characteristic (the number of $MUL_d$'s is equal to double multiplies) in the task, rather than an external characteristic (sample size, etc.). Either kind of kernel function is possible.

To reinforce our analysis of populations and thus the applicability of a predictor equation derived from one sample set in one domain being used on another, we ran another 2-sample t-test on the 45 control-sample and the 18-FFT sample. We again used the ratio of Virtual IFs to total cycles as the discriminator. For the 18-FFT example, the average ratio was around 0.00035 with a very low standard deviation (i.e., .0.035%, as opposed to about 10% for the 45-sample average). The 2-sample t-test rejected very soundly the hypothesis that these 2-samples could have been drawn from the same population. Thus a predictor drawn from one batch would have little relevance if used on the other, as our results indicate.

The present invention provides a method to derive, using regression analysis, statistically based predictor equations for SW estimation, based on task samples from particular domains. Although the benchmarks discussed above were drawn from automotive engine control, other domains, including, but not limited to industrial control, wireless and wired communications, and multimedia may also be utilized. The more particular and bounded the application space, the greater amount accuracy will be possible.

Figure 2:
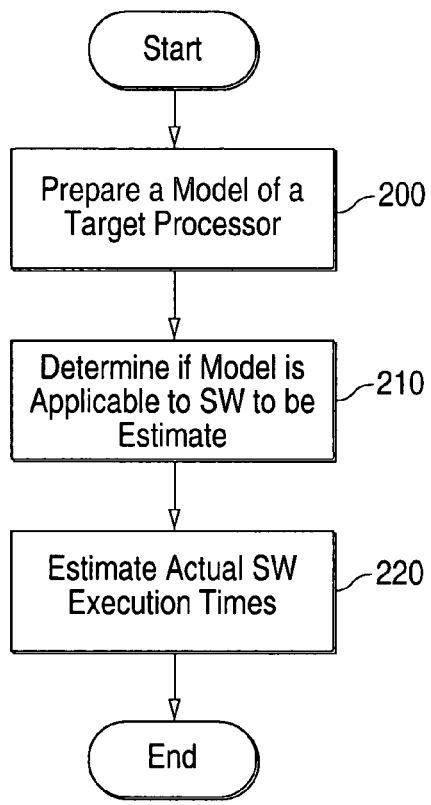
FIG. 2 is a flow chart of an overall flow of an embodiment of the present invention.
Figure 3:
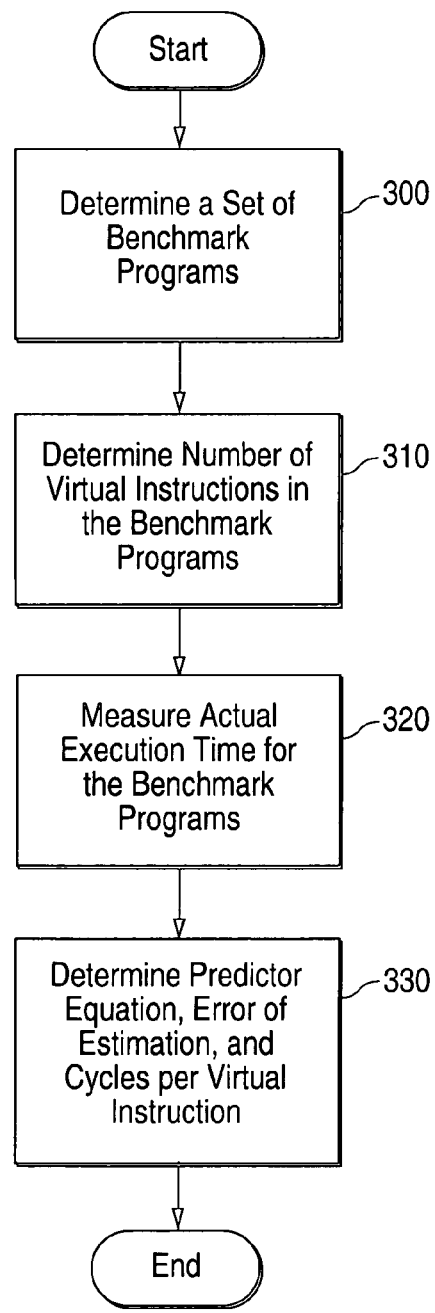
FIG. 3 is a flow chart of an embodiment of a process for preparing a model of a target processor according to the present invention.

Referring again to the drawings, wherein like reference numerals designate identical or corresponding parts, and more particularly to FIG. 2 thereof, there is illustrated a flow chart of an overall process of an embodiment of the present invention. At step 200, a model of a target processor is prepared. FIG. 3 illustrates and example process for preparing the target processor model.

In FIG. 3, at step 300, a set of benchmark programs are determined. As discussed above, the benchmark programs are preferably drawn from a single domain and represent a wide range of program flows, instructions and overall program structure. A number of virtual instructions in each of the benchmark programs (step 310), and an actual execution time of the benchmark programs is determined (step 320).

Then, at step 330, a set of predictor equations and other data (error of estimation, cycles per virtual instruction, etc.) are prepared. Step 330 may be performed by linear regression.

Figure 4:
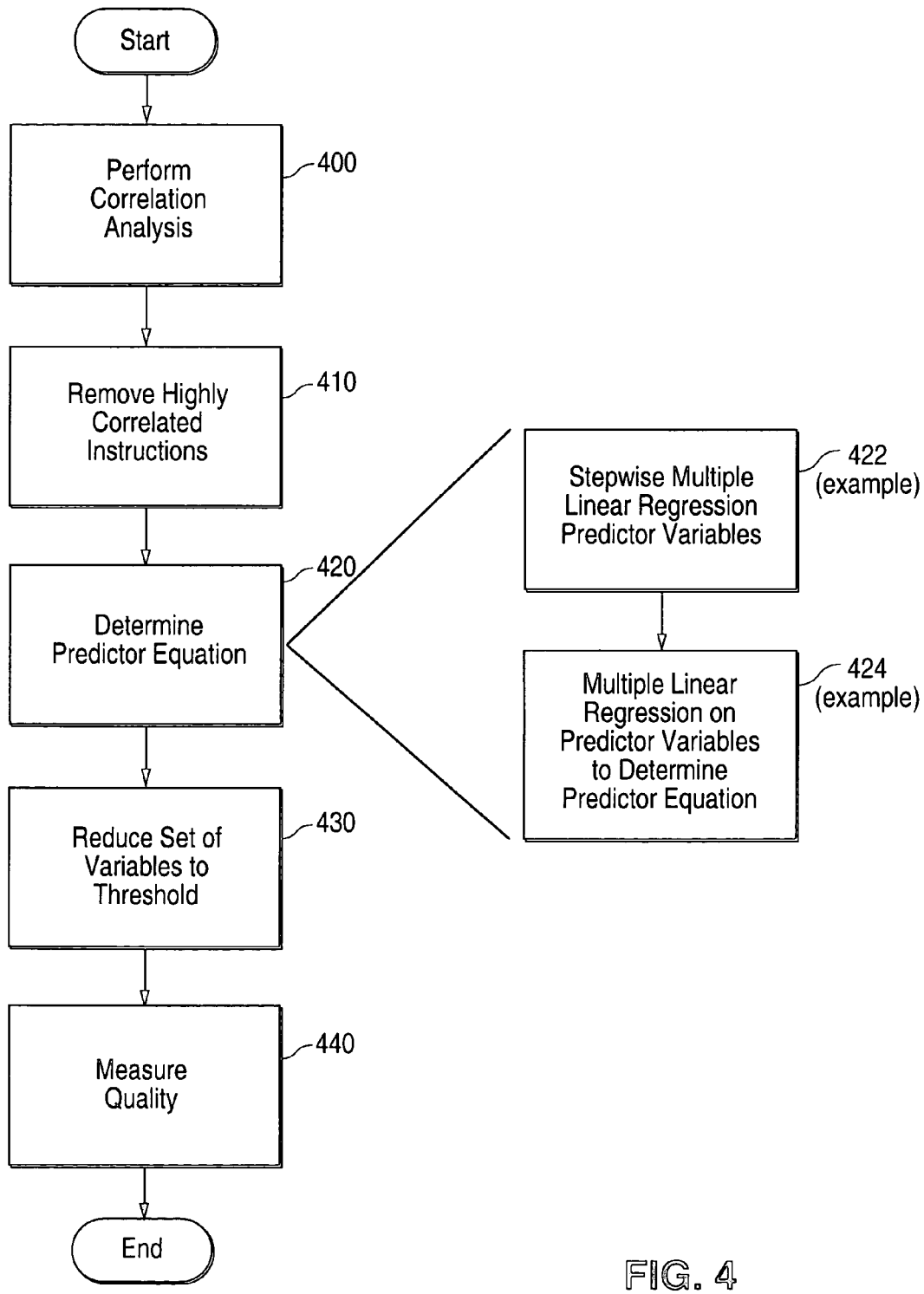
FIG. 4 is a flow chart of steps for performing linear regression according to an embodiment of the present invention.

FIG. 4 provides a flow chart illustrating example steps for performing linear regression according to the present invention.

In FIG. 4, at step 400, a correlation analysis is performed on the virtual instructions of the benchmark programs. Any highly correlated instructions are removed (step 410). Highly correlated instructions are instructions that have a highly predictable or a priori relationship between the frequency of occurrence of a first instruction and a second instruction.

At step 420, linear regression is performed to determine a predictor equation that allows prediction of a number of cycles that will be executed on a computer based on the frequency of occurrence of each instruction type (frequency of occurrence of family type instructions). Step 420 may be embodied, for example as steps 422, performing a stepwise linear regression to determine predictor variables, and 424, performing multiple linear regression on the predictor variables to derive the predictor equation.

At step 430, the set of predictor variables determined in step 420's linear regression are reduced to a predetermined threshold. The predictor variable are the independent variables ($N_i$, for example), and, as the predictor variables are reduced, the accuracy of the prediction is also reduced. Therefore, reduction of the predictor variables results in a tradeoff between complexity of the calculation (more predictor variables= higher complexity) and accuracy of the prediction. Using a threshold that is, for example, an $R^2$ value, the present inventors present inventors observed how the $R^2$ value declined with reduced independent variables, and have obtained good results with an $R^2$ threshold of 0.35.

At step 440, the predictor equation is applied to a 2nd set of benchmark programs to measure quality by determining an amount of error. Since a full set of information is available for the benchmark programs, the results of applying the predictor equation to the second set of benchmark programs provides an estimate of the execution time of the 2nd set of benchmark programs. The difference between the actual execution time and the estimated execution time gives a measure of quality of the predictor equation.

Continuing now with FIG. 2, after the model of the target processor is prepared, the actual software that is to be estimated is evaluated to determine if it is applicable or can be estimated based on a model prepared using the benchmark programs used to develop the model of the target processor in step 200. The determination may be performed in any manner that provides an amount of correlation between the software to be estimated and the benchmark programs. Preferably, the determination is made using a 2-sample t-test. If the 2-sample t-test is able to discriminate between the software to be estimated and the benchmark programs, then, the model produced using the benchmark program will likely provide inaccurate results. If the test cannot successfully discriminate, then the model will provide good estimation results. As an example, if the benchmark programs each had a number of IF statements between 30 and 90 a total number of cycles between 100,000 and 200,000. And, if the number of IF statements in the SW to be estimated is approximately 1500 and a number of cycles totaling 9,000, then, the 2-sample t-test would be able to discriminate between the benchmarks and the SW to be estimated because they are not from the same or similar populations. However, if the number of IF statements in the SW to be estimated was 60 and the number of cycles is 125,000, then, the 2-sample t-test would not make a significant discrimination because the samples are from similar populations.

At step 220, the actual execution times of the software are estimated. The software to be estimated is, for example, run in a VCC to determine the frequency of virtual instructions which is then applied to the model or predictor equation (from step 200) to provide an execution time estimate. The resulting estimated run times provide the combined most accurate and least expensive estimated software execution times currently available.

Recapping, the present invention can be implemented as a process or method, including steps to:

1) Determine an application or design domain to which a basis file will be applicable. The basis file is a set of coefficients that mathematically describe the domain.

2) Create or obtain a set of benchmark programs typical of the domain (the design domain).

3) Run the benchmark programs on VCC (or another EDA type tool) and obtain virtual instruction counts. These counts comprise the frequency of the various virtual instructions as described above (for example, the number of GOTO, multiply, and if virtual instructions).

4) Run the benchmarks of a cycle-accurate, cycle counting Instruction Set Simulator (ISS), or actual hardware, and obtain accurate cycle count.

5) Using the benchmark results, run correlation analysis on all Virtual instructions.

6) Remove highly correlated instructions from the sample.

7) Apply stepwise multiple linear regression to the pruned Virtual instruction sample set and total cycle counts and determine a set of statistically significant predictor variables.

8) Apply multiple linear regression to the set of predictor variables (Virtual instructions) and derive a predictor equation.

9) Reduce the set of predictor variables until the quality of prediction over the sample set (measured by R-squared) is at some pre-determined threshold.

10) Apply the predictor equation on a second set of benchmark software tasks from the same domain and measure the quality of the results in terms of predictor error.

11) Conduct a 2-sample t-test on the benchmark sample used to product the predictor equation and the independent quality metric sample to ensure that both samples could be drawn from the same population. One measure to use is the relative 'control-dominance' of the software tasks, using the ratio of Virtual Instruction 'IF' instructions in each task to the total cycle count, as a discriminator.

12) Use the control-dominance discriminator with new software tasks ostensibly drawn from the same domain as the set of benchmarks used to derive the predictor equation in order to determine if there is a reasonable statistical likelihood that the new set of unpredicted tasks is drawn from the same population as the original benchmark set. This is done with the 2-sample t-test.

The present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, preparing models of processing devices, selecting a set of benchmark programs, determining virtual instructions, measuring actual execution times, correlating software to be estimated to the benchmark programs, removing highly correlated instructions, performing linear regression, deriving predictor equation(s), applying predictor equations to a second set of benchmarks to measure quality, and the display, storage, or communication of results according to the processes of the present invention.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A method of estimating the execution time of software, comprising the steps of:
   preparing a model of a target processor based on a set of benchmark programs;
   correlating the software to be estimated with the benchmark programs; and
   applying the correlated software to the model to determine an estimate of the execution time of the software;
   wherein:
   the step of preparing a model comprises,
   determining a frequency of virtual instructions in the benchmark programs,
   determining actual execution times of the benchmark programs,
   determining at least one of a predictor equation, error of estimation, and cycles per virtual instruction of the benchmark programs;
   said method is embodied in a set of computer instructions stored on a computer readable media; and
   said computer instructions, when loaded into a computer, cause the computer to perform the steps of said method.

2. The method according to claim 1, wherein said model comprises a linear model that correlates instructions to execution time.

3. The method according to claim 1, wherein said step of preparing a model comprises the steps of:
   selecting a set of benchmark programs from a same domain as the software to be estimated;
   determining a set of virtual instructions in the set of benchmark programs;
   measuring actual execution times of the set of benchmark programs; and
   determining a predictor equation by correlating the virtual instructions to the actual execution times.

4. The method according to claim 1, wherein said step of correlating comprises applying a 2-sample t-test between the software to be estimated and the benchmark programs.

5. The method according to claim 4, wherein said computer instruction are compiled computer instructions stored as an executable program on said computer readable media.

6. A method of estimating the execution time of software, comprising the steps of:
   preparing a model of a target processor based on a set of benchmark programs;
   correlating the software to be estimated with the benchmark programs; and
   applying the correlated software to the model to determine an estimate of the execution time of the software;
   wherein:
   said step of preparing a model comprises the steps of:
   selecting a set of benchmark programs from a same domain as the software to be estimated;
   determining a set of virtual instructions in the set of benchmark programs;
   measuring actual execution times of the set of benchmark programs; and
   determining a predictor equation by correlating the virtual instructions to the actual execution times;
   said step of determining a predictor equation comprises the steps of,
   performing a correlation analysis between virtual instructions contained in the benchmark programs to determine which virtual instructions are highly correlated to other virtual instructions,
   removing one or more elements from each set of highly correlated virtual instructions until one of the highly correlated elements remains to produce a pruned virtual instruction set,
   performing linear regression on the pruned virtual instruction set to derive a predictor equation having a set of predictor variables,
   reducing the set of predictor variables to a predetermined threshold, and
   applying the reduced variable predictor equation to a 2nd set of benchmark programs to measure an amount of error in the reduced variable predictor equation.

7. The method according to claim 6, wherein:
   said step of measuring actual execution times comprises determining a total cycle count for each of the benchmark programs; and
   said step of performing linear regression comprises the steps of,
   applying stepwise multiple linear regression to the pruned virtual instruction set and total cycle counts to determine a statistically significant set of predictor variables, and
   applying multiple linear regression to the set of predictor variable to determine a predictor equation.

8. The method according to claim 7, wherein:
   said method is embodied in a set of computer instructions stored on a computer readable media;

said computer instructions, when loaded into a computer, cause the computer to perform the steps of said method.

9. The method according to claim 6, wherein said step of reducing, comprises reducing the set of predictor variables until a quality of prediction over the benchmark programs reaches a predetermined threshold.

10. The method according to claim 9, wherein said quality of prediction is measured via an R-squared function that measures an amount of variance in a number of cycles are explained by a variance in the predictor variables which are being regressed upon.

11. The method according to claim 10, wherein said threshold is approximately 0.35 result of said R-squared function.

12. A device for estimating execution times of software, comprising:
   modeling means for modeling a target processor;
   correlation means for correlating software to be estimated to a set of benchmark software programs that were used as a basis in said modeling means; and
   an estimation device configured to apply the correlated software to said modeling means to determine an estimated execution time of the software
   wherein said modeling means comprises:
   means for determining a frequency of virtual instructions in the benchmark programs;
   means for determining actual execution times of the benchmark programs; and
   means for determining at least one of a predictor equation, error of estimation, and cycles per virtual instruction of the benchmark programs.

13. The device according to claim 12, wherein said means for determining comprises:
   means for performing a correlation analysis on the virtual instructions;
   means for removing highly correlated instructions;
   means for deriving a predictor equation based on the non-highly correlated virtual instructions and the actual execution times of the benchmark programs; and
   means for reducing a set of variables in the derived predictor equation to a predetermined threshold.

14. The device according to claim 13, wherein said means for determining further comprises:
   means for applying the derived predictor equation to a 2nd set of benchmark programs to measure a quality of the estimation capability of the predictor equation.

15. The device according to claim 13, wherein said means for deriving a predictor equation comprises a linear regression tool applied to said virtual instructions.

16. The device according to claim 13, wherein said means for deriving a predictor equation comprises:
   means for performing stepwise linear regression to determine a set of predictor variables; and
   means for performing linear regression on said predictor values to derive said predictor equation.

17. The device according to claim 13, wherein said threshold comprises an R-squared function value that measures an amount of variance in a number of cycles caused by a variance in the predictor variables which are being regressed upon.

18. The device according to claim 17, wherein said threshold is approximately 0.35.

19. A device for performing estimates of software execution times, comprising:
   a model of a target processor based on execution time of a set of at least one benchmark program;
   a correlating device configured to correlate a software program to be estimated to the set of at least one benchmark program; and
   an estimation device configured to apply the software program to be estimated to the model to determine an estimated execution time of the software;
   wherein the model comprises,
   determining a frequency of virtual instructions in the benchmark programs;
   determining actual execution times of the benchmark programs; and
   determining at least one of a predictor equation, error of estimation, and cycles per virtual instruction of the benchmark programs.

20. The device according to claim 19, wherein said model of a target processor is a predictor equation constructed by linear regression of non-highly correlated virtual instructions of the set of benchmark programs and the execution times of the benchmark programs.

* * * * *